United States Patent
Goikhman et al.

(10) Patent No.: US 10,445,344 B2
(45) Date of Patent: Oct. 15, 2019

(54) LOAD BALANCING FOR LARGE IN-MEMORY DATABASES

(71) Applicant: Huawei Technologies Co., Ltd., Shenzhen (CN)

(72) Inventors: Shay Goikhman, Munich (DE); Antonios Iliopoulos, Munich (DE); Eliezer Levy, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 11 days.

(21) Appl. No.: 15/460,053

(22) Filed: Mar. 15, 2017

(65) Prior Publication Data

US 2017/0193077 A1    Jul. 6, 2017

Related U.S. Application Data

(63) Continuation of application No. PCT/EP2016/057438, filed on Apr. 5, 2016.

(30) Foreign Application Priority Data

Apr. 8, 2015  (EP) .................................. 15162700

(51) Int. Cl.
*G06F 16/00*       (2019.01)
*G06F 7/00*        (2006.01)
(Continued)

(52) U.S. Cl.
CPC .......... *G06F 16/285* (2019.01); *G06F 9/5016* (2013.01); *G06F 16/24552* (2019.01); *G06F 16/24578* (2019.01); *Y02D 10/22* (2018.01)

(58) Field of Classification Search
CPC ........... G06F 17/3071; G06F 17/30864; G06F 17/30598; G06F 17/30705; G06F 17/30265
(Continued)

(56) References Cited

U.S. PATENT DOCUMENTS

| | | | | |
|---|---|---|---|---|
| 6,070,191 A | * | 5/2000 | Narendran | .............. G06F 9/505 709/217 |
| 8,539,197 B1 | * | 9/2013 | Marshall | ................. G06F 13/00 711/112 |

(Continued)

FOREIGN PATENT DOCUMENTS

| JP | 2007066313 A | 3/2007 |
|---|---|---|
| JP | 2010218193 A | 9/2010 |

(Continued)

OTHER PUBLICATIONS

Kallman et al., "H-Store: A High-Performance, Distributed Main Memory Transaction Processing System," ACM, Auckland, New Zealand (Aug. 24-30, 2008).

(Continued)

*Primary Examiner* — Usmaan Saeed
*Assistant Examiner* — Raquel Perez-Arroyo
(74) *Attorney, Agent, or Firm* — Leydig, Voit & Mayer, Ltd.

(57) ABSTRACT

A data management device is provided, comprising a control module and a storage module, wherein the storage module is configured to store a plurality of data sets in a plurality of data set groups such that the plurality of data sets is assigned to the plurality of data set groups such that every data set group comprises at least one data set and every data set is stored in one data set group only and wherein the control module is configured to assign an exclusive execution context to each data set group and to estimate a number of data set requests for every data set.

18 Claims, 6 Drawing Sheets

(51) Int. Cl.
*G06F 16/28* (2019.01)
*G06F 16/2455* (2019.01)
*G06F 16/2457* (2019.01)
*G06F 9/50* (2006.01)

(58) Field of Classification Search
USPC .......................................................... 707/737
See application file for complete search history.

(56) References Cited

U.S. PATENT DOCUMENTS

| | | | |
|---|---|---|---|
| 2003/0212731 A1* | 11/2003 | Brenner | G06F 9/5088 718/105 |
| 2005/0237821 A1 | 10/2005 | Dekker et al. | |
| 2007/0047280 A1 | 3/2007 | Haustein et al. | |
| 2009/0198940 A1 | 8/2009 | Ash et al. | |
| 2009/0319992 A1 | 12/2009 | Duffy et al. | |
| 2012/0079484 A1* | 3/2012 | Shoolman | H03M 7/3088 718/100 |
| 2013/0151683 A1* | 6/2013 | Jain | G06F 3/0611 709/223 |
| 2013/0219144 A1 | 8/2013 | Oe et al. | |
| 2013/0290598 A1* | 10/2013 | Fiske | G06F 3/0625 711/103 |
| 2015/0363465 A1* | 12/2015 | Bordawekar | G06F 16/24542 707/718 |

FOREIGN PATENT DOCUMENTS

| | | |
|---|---|---|
| JP | 2013171305 A | 9/2013 |
| JP | 2014010604 A | 1/2014 |
| RU | 2383952 C2 | 3/2010 |
| WO | WO 2016124259 A1 | 8/2016 |

OTHER PUBLICATIONS

Lim et al., "MICA: A Holistic Approach to Fast In-Memory Key-Value Storage," Proceedings of the 11$^{th}$ USENIX Symposium on Networked Systems Design and Implementation, Seattle, WA (Apr. 2-4, 2014).

Gidron et al., "SALSA: Scalable and Low Synchronization NUMA-aware Algorithm for Producer-Consumer Pools," (2012).

Tuzun et al., "Scalable and dynamically balanced shared-everything OLTP with physiological partitioning," Regular Paper, pp. 152-175 (Jun. 2012).

* cited by examiner

LOAD BALANCING FOR LARGE IN-MEMORY DATABASES

CROSS-REFERENCE TO RELATED APPLICATIONS

This application is a continuation of International Application No. PCT/EP2016/057438, filed on Apr. 5, 2016, which claims priority to European Patent Application No. EP15162700.7, filed on Apr. 8, 2015. The disclosures of the aforementioned applications are hereby incorporated by reference in their entireties.

TECHNICAL FIELD

The embodiments of the present invention relate to the technical field of data management devices, for example computer devices for storing and managing particularly large amounts of data and for providing these data to a client for read or write operations.

BACKGROUND

Large in-memory databases are currently being used on production bases to serve as key-value stores, online transaction processing (OLTP) databases, large-scale web applications, massive online multi-player games, software defined networks (SDN) controller network views, scientific simulation, etc. These applications are built to sustain high transaction rates using multiple execution contexts, e.g., threads in non-uniform memory access (NUMA) shared-everything architectures, whereby the dataset is logically partitioned and each partition is associated with an execution context which is responsible to process transactions on its partition.

The partitioning strategy enforces the exclusiveness of an execution context upon a partition such that the transaction is executed in a single-thread physical access environment without taking any locks or latches, as described in Kalman, Robert et al.: H-store: A High-performance, Distributed Main Memory Transaction Processing System, VLDB Endowment, August 2008. This approach may be described as combining high efficiency of serial processing on a partition, with parallelism employed across the partitions enabling scaling-up transaction processing.

Static partitioning strategy can, however, entail efficiency problems and severely limit the scalability when even a slightly skewed workload distribution is imposed on the data-set, as some executing contexts may encounter exceptionally high update rate, while the other ones being under-worked, rendering the partitioning useless. As some authors state, the varying workload skew in real world examples is rather the rule, than an exception, as described in Pinar Tozun et al.: Scalable and dynamically balanced shared-everything OLTP with physiological partitioning, The VLDB Journal DOI 1007/s00778-012-0278-6, June 2012.

Hyeontaek Lim et al.: MICA: A Holistic Approach to Fast In-Memory Key-Value Storage, NSDI'14, April 2014, Seattle, Wash. USA describes an in-memory key-value store which addresses the workload skew by utilizing a special static hash function trying to distribute the placement of keys in partitions such that in average the load on a partition is under 53% deviation on a Zipf distribution experiment. However, with the static placement and partitioning strategy the system may be non-adaptive and thus may be less efficient when the load is, for instance, low.

SUMMARY

It may be seen an object of the invention to provide a data management device which solves the skewing problem, i.e. provides a partitioning which enables an efficient work load balancing between different exclusive execution contexts.

This object is solved by the subject matter of the independent claims. Further embodiments are stated in the dependent claims and in the following description.

According to an aspect of the invention, a data management device is provided. The data management device comprises a control module and a storage module, wherein the storage module is configured to store a plurality of data sets in a plurality of data set groups such that the plurality of data sets is assigned to the plurality of data set groups such that every data set group comprises at least one data set and every data set is stored in one data set group only and wherein the control module is configured to assign an exclusive execution context to each data set group and to estimate a number of data set requests for every data set. The control module is further configured to determine data sets for every data set group based on the estimated number of data set requests and to reassign the data sets to the data set groups such that the estimated number of data set requests in a data set group is less or equal to a predetermined number of data set requests for at least one exclusive execution context which is assigned to one of the plurality of data set groups.

Particularly, the data management device described herein may solve the skewing problem in partitioned in-memory data stores on shared-everything architectures. It may be one aspect of the data management device that an accurate instantaneous statistical model of the global dynamic workload distribution is built and that the data set is re-partitioned according to the perceived load. The data management device may be described as implementing a pro-active method applied to an in-memory database or data store.

An exclusive execution context may be a thread which is executed on a processing unit of a computing device. In the following, when referring to a thread it should be understood that the respective statement generally also relates to an exclusive execution context. A data set as referred to above may be described as one stripe comprising at least one key-value entry (preferably more than one key-value entry which are assorted or clumped together) and a data set group is one partition comprising multiple data sets. These terms may be used representative for each other, respectively.

A data set request may particularly relate to one operation (read/write) to a data set which is initiated by a client and forwarded to one of the threads to be executed on a data set in one of the partitions. A data set requests may be processed on the partitions (with exclusive contexts each) and can be of various types, for example they can be structured query language (SQL) or OLTP transaction. When the control module initiates a re-partitioning, it may also take into account both the count and the types of the requests executed, and might even collapse/merge partitions.

In general, the control unit might use whatever platform-dependent, application and dynamic information in its re-partitioning decisions.

Each data set group comprises a plurality of data sets and each data set is contained in only one data set group. This relation may be describes as an N to 1 relation of data sets to data set groups.

The requests per thread may be described as a value function based on the measured number of request processed on the data store taken as the likelihood of the present and/or future distribution of the request arrival rate divided by the initial number of assigned threads. The requests per thread can be made static when the control module can determine or determined the performance of the threads and can decide on the number of threads to be assigned, thereby reducing the number of threads and saving power dissipation if it decides to do so.

The data management device and particularly the control unit is configured to determine data sets for every data set group. For example, the composition of every data set group is determined, i.e. for every single data set it is determined which data set group it is assigned to.

For example, the control module may be configured to determine data sets for every data set group based on a distribution of data set requests over the data set groups and to reassign the data sets to the data set groups such that an expected number of data set requests in a data set group is less or equal to a predetermined number of data set requests for at least one exclusive execution context which is assigned to one of the plurality of data set groups. Thus, the partitioning is carried out based on the expected number of requests per partition.

In one embodiment, the control module may further be configured to determine a likelihood of data set requests for every data set and/or to determine the data sets for every data set group based on cumulative likelihood functions of specific request types across the storage module and to reassign the data sets to the data set groups such that the likelihood of the number requests in a data set group is less or equal to a predetermined number of requests per exclusive execution context. For example, an OLTP request may access several data store locations for read/write. In other words, the OLTP request has the probability to cover said subset data store which is an extension of get/put that has probability to cover a specific location in the data store.

It may be one aspect of the data management device to resize the partitions such that the mapping of data sets to the data set groups is reassigned. This reassigning may be based on the statistical likelihood of the request distribution across the data store and thus enables corrective and predictive load balancing such that the processes accessing the data set groups avoid serialization in the presence of skew in the request distribution and enabling parallelization of request processing and scalability.

According to an embodiment of the invention, the control module is configured to dynamically adapt the predetermined number of data set requests for at least one exclusive execution context which is assigned to one of the plurality of data set groups during operation of the data management device.

Thus, the threshold value can be adapted to changed load conditions of the data management device, for example if the total number of data set requests increases or decreases and the number of data set groups and threads remains constant.

According to a further embodiment of the invention, the control module is configured to estimate a likelihood of data set requests for every data set and to determine the data sets for every data set group based on a cumulative likelihood function of requests across the storage module and to reassign the data sets to the data set groups such that the likelihood of the number of requests in a data set group is less or equal to a predetermined number of data set requests for at least one exclusive execution context which is assigned to one of the plurality of data set groups.

In other words, the control module may be configured to determine the data sets for every data set group based on a cumulative likelihood function of request distribution across the storage module, where each request may be assigned a weight, i.e. a metric value, and to reassign the data sets to the data set groups such that the likelihood of the number of requests in a data set group is less or equal to a predetermined number of requests per exclusive execution context.

According to a further embodiment of the invention, the likelihood of the number of data set requests per data set is approximated by measuring the number of data set requests applied to each data set, scaled by individual request weight parameters and the cumulative likelihood distribution function, CDF, calculated on the likelihood of requests on datasets.

The likelihood of requests on datasets may be calculated on datasets ordered in a predetermined order in the storage module. The repartitioning method may be obtained by computing the reverse of the cumulative distribution function as follows:

$$j=CDF^{-1}(\text{work-per-thread}*k)$$

where $1<=k<=\text{Num\_of\_threads}$, j is the index of data set in the total order Thus, the requests per data set are arranged in an array in some order (to be defined by sorting or some other means). For example, there may be an array pdf [i] which holds the number of accepted requests in data set i, $0<=i<=N$ with N the number of data sets in one data set group. Then the CDF is computed as a recurrence equation as follows:

$$CDF[0]=pdf[0]$$

$$CDF[i]=pdf[i]+CDF[i-1]; \text{ where } 1<=i<=N$$

The computation of $CDF^{-1}$ may be done by using a customized binary search as follows:
bin_search (CDF, work-per-thread*k) returns index j,
where CDF $[j]<=$work-per-thread*k According to a further embodiment of the invention, the control module is configured to dynamically vary the number and/or the identity of data sets contained in one data set group.

The size of data set groups can be varied during operation of the data management device. Varying the identity of data sets contained in one data set group may be described as rearranging the assignment of data sets to data set groups, for example data set 1 may be arranged in another data set group after rearrangement of data sets.

Thus, the size and/or the content of data set groups is adapted based on the number and/or type of data set requests. Resizing the data set groups may have the effect that a data set group containing less frequently requested data sets can be larger and a data set group containing more frequently requested data sets can be smaller (wherein the frequency is approximated by the likelihood distribution function as described above, for example) such that the overall workload of the data set groups is equalized and serialization is avoided (and at the same time parallelization is enabled) in the presence of work request skew.

A workload skew exists for example if one data set group gets most of the requests. In this case, only one thread processes them serially. The performance of the data management device is then typically limited to the throughput of one thread with the latency increased two times as much, as if two threads were working in parallel (with twice throughput).

According to a further embodiment of the invention, the control module is configured to repeatedly determine the data sets at least for the first data set group and to reassign the data sets to the data set groups if the difference between the number of the determined data sets at least for the first data set group and a current number of data sets at least in the first data set group exceeds a predetermined threshold value.

In other words, the repartitioning calculation is periodically repeated or triggered by a system event, for example every few seconds. If the difference between the new size of the first data set group and the old size of the first data set group does not exceed the threshold value, the partitioning computation is discarded.

The control module may repeatedly determine the number of data sets for each data set group and may carry out the steps to each data set group and not only to the first data set group.

On the one hand, carrying out repartitioning may cost system resources since it requires computational power and on the other hand, repartitioning leads to better work load balance of the partitions and the assigned threads. It may therefore be advantageous to assess if the expected gain on system performance as a result of the repartitioning is higher than the required computational power for repartitioning.

In this embodiment, repartitioning is carried out only if the expected gain on system performance due to repartitioning is higher than the resource costs of repartitioning, which is achieved by comparing the current partition size with the expected new partition size and determining the difference between them.

According to a further embodiment of the invention, the control module is configured to reassign the data sets to the data set groups if the difference between the first number of data set requests of the first data set group and the second number of data set requests of the second data set group is equal or higher than the predetermined threshold value.

In this embodiment, repartitioning is one started if the difference between two data set groups is higher than a predetermined threshold value. In other words, the overall gain in system performance (repartitioning costs—gain on system performance) may not only consider the current partition size and the expected partition size but also the change in relative partition size of two or more partitions.

This particularly relates to rearranging the data sets in data set groups and may be advantageous in case of skew workload between two existing partitions.

The threshold value (difference between first and second partition) can be chosen such that the repartitioning is not performed too often or at minimum differences as this costs computational power and repartitioning is carried out if the workload on the data set groups is such that the additional computational power due to skew workload is equal or higher to the computational power of a reassigning process.

According to a further embodiment of the invention, the control module is configured to assign the data sets to a data set group in an ascending order of the number and/or types of data set requests.

An ascending order of the number of data set requests means that the data sets are logically arranged such that the number of data set requests increases and then the assigning of data sets to data set groups is carried out according to this order. For example, the data sets with low data set requests are assigned to the first data set group until the first data set group has been assigned as much data sets to reach the threshold value of data set requests (=sum of the data set requests of all data sets in the first data set group); subsequent data sets may be assigned similarly to subsequent data set groups until the threshold value of data set request per data set group for is reached for the respective data set group.

The control module may be configured to assign the data sets in the total order of data sets in the storage module.

In this embodiment, data set groups containing data sets with comparable data set request numbers are created. The request number of the data set groups (i.e. the sum of the requests of all data sets in one group) is adjusted to a similar level and the data sets in the individual data set groups may also be grouped such that the request numbers of the data sets are almost similar.

This may overcome non-adjacent spikes in the request distribution per threads. After repartitioning, the data sets are arranged in data set groups such that the threads and the according partitions are adjacent to each other according to their workload and no thread with any workload is arranged in between. A proper weight scaled on the data sets involved in the multi-dataset transactions may guarantee adjacency of these data sets in the total order and may thus enable merging the data set groups accordingly.

According to a further embodiment of the invention, the control module is configured to assign the data sets to a data set group in a descending order of the number of data set requests.

In this embodiment, the data sets are logically arranged such that the number of data set requests decreases and then the assigning of data sets to data set groups is carried out according to this order. The data sets with high number of data set requests are assigned to the first data set group until the first data set group has been assigned as much data sets to reach the threshold value of data set requests (=sum of the data set requests of all data sets in the first data set group). Subsequent data sets are assigned similarly to subsequent data set groups until the threshold value of data set request per data set group is reached for this data set group.

In this embodiment, the position of the strongly requested or demanded data sets can be determined. Strongly requested data sets are arranged in the first data set group.

Alternatively, the control module may be configured to assign the data sets to the data set groups in the total order of data sets in the storage module.

According to a further embodiment of the invention, the storage module is a non-persistent storage.

The non-persistent storage may be a random access memory (RAM) and the data set groups thus may establish an in-memory database in order to enable high transaction rates.

According to a further embodiment of the invention, the control module is configured to create a plurality of exclusive execution contexts and to assign each exclusive execution context to one data set group.

An exclusive execution context may thus be described as a working thread which is assigned to one data set group in order to execute operations on data sets of this data set group.

Having multiple exclusive execution contexts allows load balancing at the hierarchical level of exclusive execution contexts and creation of new exclusive execution contexts if the existing exclusive execution contexts are overloaded.

Different levels of load balancing may thus be referred to as follows: a first level of load balancing is repartitioning, as described above; a second level of load balancing is performed by creating additional exclusive execution contexts (working threads) which can deal with pending requests in order to reduce the average workload of the existing threads.

In case of reduced system workload, i.e. when the overall workload allows, the control module will shut down at least one or some exclusive execution contexts to reduce power, and reassigns the partitions to the remaining exclusive execution contexts.

According to a further embodiment of the invention, the control module is configured to at least temporarily reassign a plurality of exclusive execution contexts to one data set group.

The control module can be one or more processors or cores of a processor. The control module may take work of threads and assign it to other threads in order to achieve work load at a time scale of u-seconds. This assignment is preferably a temporary assignment, i.e. in case that one exclusive execution context is overloaded and another exclusive execution context has no pending requests in its requests queue.

In this embodiment, particularly when one exclusive execution context cannot utilize the available workload of one data set group, it is advantageously to assign more than one exclusive execution context to one data set group in order to have a balanced system, i.e. the exclusive execution context and the data set groups are loaded at a similar level, for example both in the range between 75% and 85% of their maximum capacity.

According to a further embodiment of the invention, the control module is configured to determine the average load of one exclusive execution context and to create additional exclusive execution contexts if the average load exceeds a predetermined load value.

Thus, the number of exclusive execution contexts can be determined adequately based on the current overall system load. Similarly, the number of exclusive execution contexts may be reduced if the workload allows.

According to a further embodiment of the invention, the control module is configured to determine the workload of any exclusive execution context and to reassign the exclusive execution contexts to the data set groups if the workload of a first exclusive execution context is a predetermined threshold value over the workload of a second working process.

This enables load balancing on an additional level; the first load balancing mechanism is the resizing of the data set groups and the second load balancing mechanism is the reassigning of the working processes to data set groups. Thus, the granularity of load balancing is improved and different mechanisms can be used in different scenarios. Particularly, reassigning the working processes to data set groups requires lower computational power than resizing data set groups.

In other words, the data management device may be described as follows: It may be seen an aspect of the data management device to take the concept of thread exclusiveness on a partition of the dataset one step further by considering the workload dynamics. By modelling a key-value store as a collection of stripes, and by modelling the cost of each thread operations applied to its stripes partition, a statistical model of the global load distribution over the partitions is built. This model, enhanced by the platform characteristics and combined with applying serial-parallel tradeoff reasoning, is used to compute a new dynamically balanced partitioning of the data set that achieves adequate throughput-latency overall performance under the perceived load. By taking advantage of the shared-everything architecture, the resizing of the partitions may occur without any data movement.

This approach may enable a global view of all-machine resource utilization according to perceived workload, thereby it may enable matching the perceived workload with more efficient resources utilization thus promoting high efficiency. The data management device may be lightweight, it may respond fast to skewed workload distribution and variability and may enable instantaneous balancing through work stealing from one thread and reassigning the stolen work to another thread. The approach described herein may enable advanced optimizations based on dynamically-captured information, e.g., hot/cold clustering. Static knowledge and constrains may be utilized to enhance single-thread performance. Dynamic information may be utilized to enhance multi-thread performance. Altogether all these qualities may contribute to highly efficient scalable key-value store.

BRIEF DESCRIPTION OF THE FIGURES

Embodiments of the invention will be described with respect to the following figures, in which.

DETAILED DESCRIPTION OF EMBODIMENTS

Figure 1:
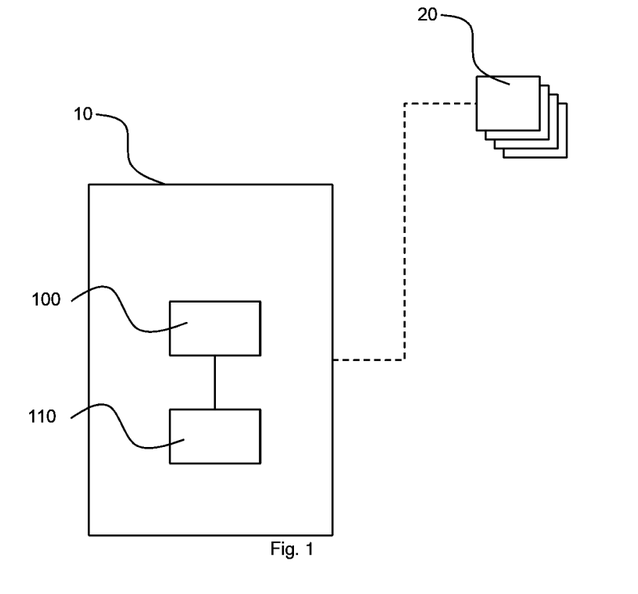
FIG. 1 schematically shows a data management device according to an exemplary embodiment of the invention connected to a plurality of requesting devices.

FIG. 1 shows a data management device 10 with a control module 100 and a storage module 110, wherein the data management device 10 is communicatively connected to one or more requesting devices 20, which may be referred to as clients. The data management device may also be referred to as server.

The storage module 110 is configured to contain an in-memory database containing multiple data set groups each of which has a plurality of data set entries. The control module 100 is configured to schedule the access of the requesting clients to the storage module 110 and to organize the structure of the in-memory database (re-partition, reassign threads to partitions, etc. as described above with reference to the data management device).

Figure 2:
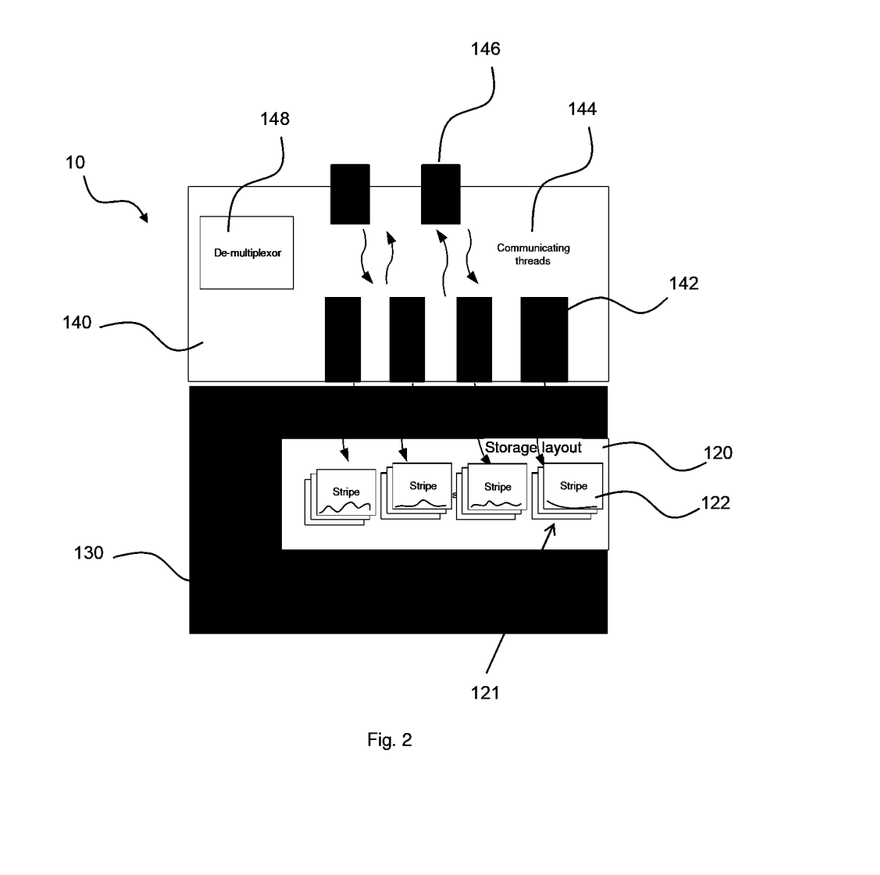
FIG. 2 schematically shows key-value store thread model of a data management device according to an exemplary embodiment of the invention.

FIG. 2 shows a common key-value store thread model which may be used by the data management device 10. In particular, FIG. 2 may be referred to describe the partitioning and thread assignment in an in-memory key-value store. The Storage Layout abstraction 120 designates sets of stripes 122, each stripe representing an aggregate of rows of some table defined in the key-value store. The key-value store operation processing is divided between the Front End (FE) 140 and the Back End (BE) 130. A set of working queues 142, each comprising a pair operation request queue and its response queue, are the main interface between the FE 140 and the BE 130. Each queue is associated with a BE working thread.

The FE 140 consists of a set of communication threads 144 and De-multiplexor 148. De-multiplexor 148 is used to determine the specific queue to enqueue the request on.

The communication threads 144 read the communication sockets obtaining requests, determine the target queues using De-multiplexor, and posts the request on the request queues. In the reverse direction, the communicating threads read response queues and deliver the responses to the associated sockets 146.

The BE 130 consists of a set of working threads, and for each thread, a corresponding set of stripes 122 that can come from different tables, called partition 121. The distribution of all the stripes to partitions and the assignment of the threads to partitions determine the partitioning.

A working thread de-queues a request from its request queue, executes it on one of the stripes in its partition and posts the response on its response queue. If the partitioning is static, under a skewed workload the requests might target only a small number of partitions; the operation of the key-value store then features low throughput at high latency, as a small number working thread needs to process most of the requests, while the rest of the threads are idle.

To tackle with the skew problem each stripe is augmented in the dataset with additional members to store the stripe's execution count and its global ordering position in a total-order enumeration of all the stripes. Initially, the stripes can be ordered arbitrarily and the partitioning can contain an equal number of stripes in each partition.

When the application runs the threads increment the stripes' execution counts by the number proportional to the 'weight' of the executed operation. A probability distribution function (PDF) is associated along the ordering dimension (identified with the total order positioning of the stripes, which is called the x-axis), with the histogram of the execution counts along the x-axis.

Figure 3:
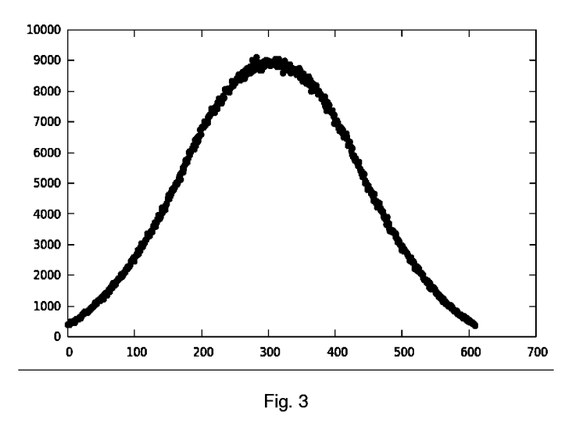
FIG. 3 schematically shows a histogram of a probability distribution function over a plurality of data set groups of a data management device according to an exemplary embodiment of the invention.

FIG. 3 depicts the histogram of a Gaussian PDF over 620 stripes.

The stripes can be re-positioned along the x-axis using any inter-stripe neighboring relationships derived from the platform characteristics, or any application-defined policies, thereby defining a new total ordering of the stripe along the x-axis. As the x-axis is partitioned to intervals, the new ordering determines the neighboring relationships among the partitions. For instance, the stripes can be sorted by their execution counts, thereby ordering the stripes by 'heat', and thus, obtain a gradual hot/cold clustering. Similarly, other dynamic indicators of the transaction execution on the stripes can be captured and modeled as neighbouring relationships.

The PDF is integrated along the new x-axis, thereby computing the workload cumulative distribution function (CDF). An average work-per-thread value is computed by dividing the right-most border CDF value by the number of execution threads. Alternatively, having learned the maximal possible work-per-thread value under peak-performance conditions, the number of the desired working threads can be derived adequately for the perceived workload, thereby making a tradeoff between the delivered throughput and latency, and allocating the thread resources elsewhere.

Thereafter, the y-axis of the CDF is divided by increments of the work-per-thread value, and projected over the x-axis, thereby obtaining the partitioning of the x-axis into intervals such that each interval has an equal increment in the CDF.

Figure 4:
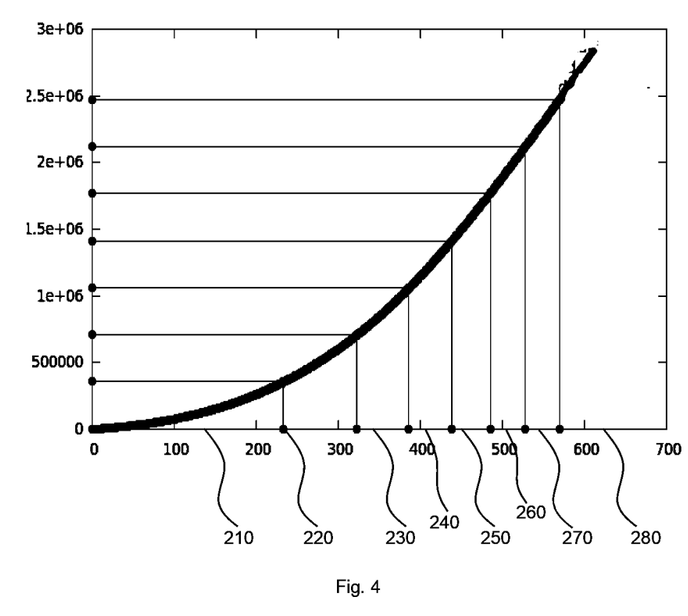
FIG. 4 schematically shows the partitioning of data set groups based on a cumulative distribution function on sorted probability distribution function in a data management device according to an exemplary embodiment of the invention.

FIG. 4 illustrate the CDF, integrated over a sorted Gaussian PDF, partitioned into eight intervals, namely the partitions 210, 220, 230, 240, 250, 260, 270 and 280. The last partition 280 ends at 620, see number of stripes mentioned with reference to FIG. 3.

Each interval is associated with a partition of stripes that is owned by some thread. Thus, by resizing these partitions the load over the execution threads is equalized.

By association, if a communication thread is assigned to serve a partition, such that the requests/responses to the partition are delivered through the associated connections served by the communication thread, the load on the communication threads is equalized after the re-partitioning. That requires the delivery of the partitioning information to the data store client 20, such that the client 20 can choose the specific connection to send the request on.

Thus, re-partitioning takes care of communication as well, avoiding performance overheads spent on contention management when several communication threads may want to enqueue their requests to a popular partition.

The approach of imbalance detection may be derived from the re-partitioning algorithm: a new partitioning is computed and the sizes of new partitions are compared to the sizes of the old ones. If the difference exceeds a threshold value the new partitioning is installed instead of the old one. Otherwise the new partitioning computation is discarded.

The imbalance detection may be run periodically, or re-partitioning may be triggered by some system event like the exhaustion of free request buffers on some queue designating significant imbalance situation. In case of slowly varying workload, the imbalance detection algorithm may be run infrequently. To compensate for instantaneous spikes in load distribution across the working threads a work stealing policy can be employed. That is, a thread with an empty queue may probe its neighbor queue and execute requests on the neighbor's partition. Work stealing thus enables instantaneous dynamic load balancing as well as transaction spanning neighbouring partitions.

The described approach may enable solving the skew problems in various granularities in a global manner over a partitioned key-value stores on shared-everything architectures.

One exemplary implementation example is described with reference to FIGS. 5 to 7.

This example is related to an operational hash-based key-value store. That is, the store holds rows identified by their keys in some order. The hash-table inside the De-multiplexer maps the keys to stripes and rows relative to the stripes.

The central data-structure is the composition of Ranges[ ] arrays 520 and Stripes[ ] arrays 510. The Stripes[ ] element contains a reference to a data structure representing a stripe 122; the stripe data structure includes an execution counter 540 that reflects the cost of all operations executed on the stripe. Additionally, the stripe data structure includes an integer value RasMap 530 that designates the position of the first row of the stripe in the stripes' global total order.

The Stripes[ ] array 510 is ordered according to this total order. The Ranges[ ] array 510 holds the high index defining a high border of a range in the Stripes[ ] array. The low border of the range is implicitly defined by the previous element's 'high' index of the Ranges[ ] array. Additionally, the Ranges[ ] element includes a working queue 525, associated with the range of stripes. Therefore, the Ranges[ ] partitions the Stripes[ ] array into ranges, and maps ranges to working queues.

Figure 5:
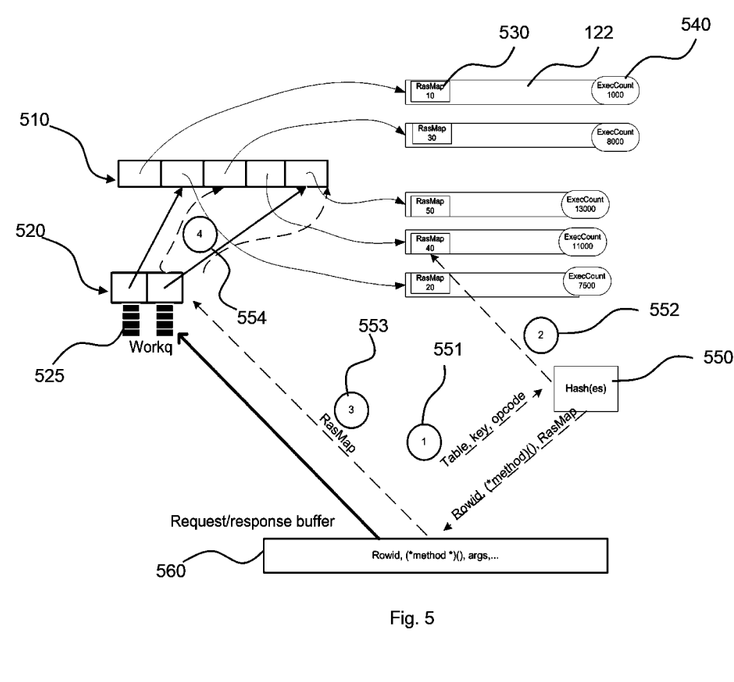
FIG. 5 schematically shows the composition of data set groups in a data management device according to an exemplary embodiment of the invention.

FIG. 5 depicts the composition of Ranges[ ] and Stipes[ ] holding references to five stripe structures, representing two tables, and the RasMap and ExecCounter members of each of the stripes. The Stripes[ ] references are ordered by the RasMap value 530, which reflects the ordering of the stripes by execution counts, according to the values of ExecCount 540. Note also, that each range holds stripes from different tables.

The basic operation that the composition of Ranges[ ] and Stripes[ ] supports is the routing of the requests to the specific queues, and the re-partitioning, that is, dynamically resizing the partitions, or in other words dynamic control of inclusion of stripes in threads' partitions. The request routing process is schematically depicted in the lower part of FIG. 5. FIG. 6 shows the control flow of the request routing processing.

At step 551, a request denoting table, key and a point operation opcode is received. The corresponding hash table 550 is accessed translating the table and the key to stripe and rowid references. In case of an 'insert' operation, there's no reference to the key in the table. Thus the corresponding table's insertion method is called, which names stripe and rowid for the insertion, which are placed in the corresponding hash table. From there on, an insert is treated as an update.

At step 552, holding the stripe reference, its RasMap is read, and the opcode is "translated" to the corresponding stripe's method invocation pointer. A request-response buffer 560 is obtained and is filled in with the method, rowid, and any additional arguments.

At step 553, the Ranges[ ] array is binary searched using the obtained RasMap. At step 554, the binary search, the sub-range's low and high elements of the Stripes[ ] are dereferenced to their RasMaps and compared to the obtained RasMap. Whereas the RasMaps is included in the sub-range, the request-response buffer is pushed onto the sub-range's work queue.

Figure 6:
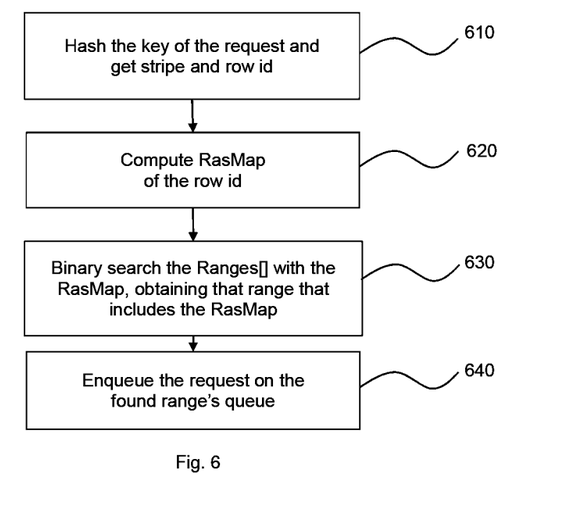
FIG. 6 schematically shows the request routing processing in a data management device according to an exemplary embodiment of the invention.

With other words, as depicted in FIG. 6, the primary key of the request is hashed through the De-multiplexor's hash table 550 to obtain the stripe and row id of the row on which the request is going to be executed, step 610. Having obtained the stripe structure, the RasMap of the row is computed in step 620 by adding row id and the RasMap of the stripe. With the obtained RasMap a binary search is done over the Ranges[ ] array finding the range and the associated working queue, see step 630. At last, the request is queued on the found working queue, step 640.

Figure 7:
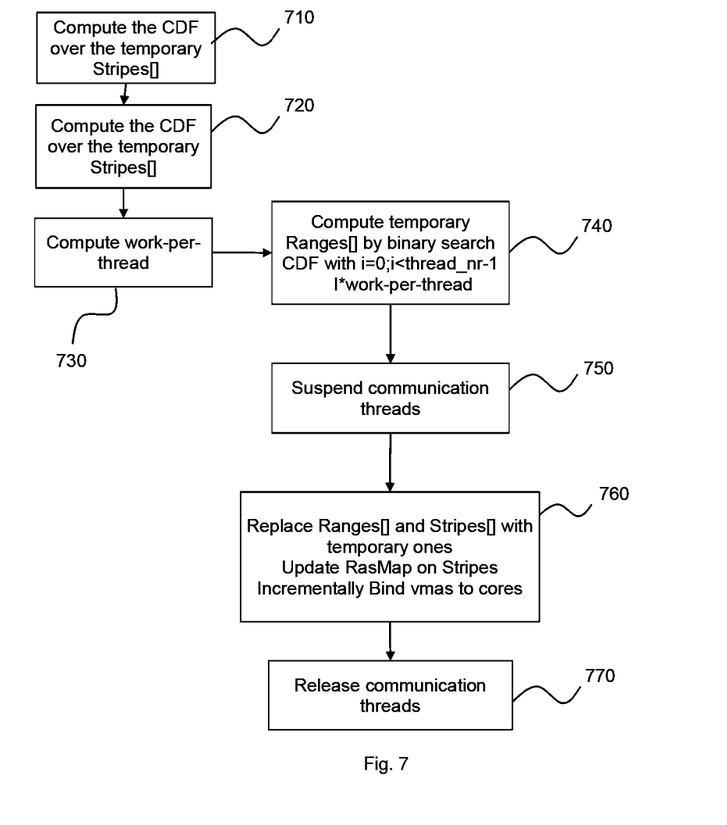
FIG. 7 schematically shows the steps of re-partitioning data set groups in a data management device according to an exemplary embodiment of the invention.

FIG. 7 contains a flowchart that presents the basic control flow of the re-partitioning in which the stripes are regarded as indivisible for the simplicity of exposition. Stripes may be subdivided and merged according to the partitioning. In this example the stripes are clustered by 'heat', i.e. number of requests.

In a separate thread running periodically, a temporary Stripes[ ] array holding references to all the stripes structures is sorted according to the execution counters, step 710. The stripes' structures RasMap's would be updated later to reflect the sort order. Next, the CDF is computed using a simple recurrence over a temporary array, step 720. The average-work-per-thread value is computed in step 730 by dividing the last CDF element by the number of working threads. A new, temporary Ranges[ ] array is computed in step 740 by binary searching the CDF array by a multiple of the average-work-per-thread value. At last, old Ranges[ ] and Stripes[ ], are replaced by the temporary Ranges[ ] and Stripes[ ] and the RasMap of the Stripes is updated, while suspending all the communication threads, step 750. Finally, stripes are incrementally re-bound to the corresponding thread cores, step 760, and relinquish the communication threads, step 770. It should be noted that bulk of the re-partitioning computation may be done without affecting the normal operation of the key-value store, therefore making it relatively lightweight.

What is claimed is:

1. A data management device for managing large in-memory databases, the device comprising:
    a processor;
    a memory coupled to the processor and storing instructions for execution by the processor;
    the memory is configured to store a plurality of data set groups, and each data set group comprises at least one data set and every data set is stored in one data set group only; and
    the processor, when executing the instructions, is configured to have a shared address space, dynamically assign each execution context in a set of execution contexts to a data set group in the shared address space, wherein each data set group is a partition exclusively owned by an execution context and the partitions are re-sized in a rebalancing event and remapped to other execution contexts by;
    a) assigning an execution context to each data set group;
    b) estimating a number of data set requests for every data set;
    c) determining data sets for every data set group based on the estimated number of data set requests and to reassign the data sets to the data set groups such that the estimated number of data set requests in a data set group is less than or equal to a predetermined number of data set requests for at least one execution context which is assigned to one of the plurality of data set groups;
    d) creating a plurality of execution contexts and to assign each execution context to one data set group;
    e) determining an average load of one execution context;
    f) creating additional execution contexts when the average load exceeds a predetermined load value; and
    g) shutting down at least one of the execution contexts and reassign the corresponding data set groups to the remaining execution contexts without moving the corresponding data set groups, when the system workload is reduced.

2. The data management device of claim 1, wherein the processor is further configured to dynamically adapt the predetermined number of data set requests for at least one exclusive execution context which is assigned to one of the plurality of data set groups during an operation of the data management device.

3. The data management device of claim 1, wherein the processor is further configured to:
    estimate a likelihood of data set requests for every data set; and
    determine the data sets for every data set group based on a cumulative likelihood function of requests across the memory and to reassign the data sets to the data set groups such that the likelihood of the number of requests in a data set group is less than or equal to a predetermined number of data set requests for at least one execution context which is assigned to one of the plurality of data set groups.

4. The data management device of claim 3, where the likelihood of the number of data set requests per data set is estimated by measuring the number of data set requests applied to each data set, scaled by individual request weight parameters and the cumulative likelihood distribution function (CDF) obtained on the likelihood of requests on datasets.

5. The data management device of claim 1, wherein the processor is further configured to dynamically vary at least one of (a) the number of data sets contained in one data set group, and (b) the identity of data sets contained in one data set group.

6. The data management device of claim 1, wherein the processor is configured to repeatedly determine the data sets at least for a first data set group and to reassign the data sets to the data set groups when a difference between the number of the determined data sets at least for the first data set group and a current number of data sets at least in the first data set group exceeds a predetermined threshold value.

7. The data management device of claim 1, wherein the processor is configured to reassign the data sets to the data set groups when the difference between a first number of data set requests of a first data set group and a second number of data set requests of a second data set group is equal to or higher than a predetermined threshold value.

8. The data management device of claim 1, wherein the processor is configured to assign the data sets to a data set group in an ascending order of at least one of (a) the number of data set requests, and (b) types of data set requests.

9. The data management device of claim 1, wherein the processor is configured to assign the data sets to a data set group in a descending order of the number of data set requests.

10. The data management device of claim 1, wherein the memory is a non-persistent storage.

11. The data management device of claim 1, wherein the processor is configured to at least temporarily reassign a plurality of execution contexts to one data set group.

12. The data management device of claim 1, wherein the processor is configured to determine a workload of each execution context and to reassign the execution contexts to the data set groups when a workload of a first execution context is a predetermined threshold value over a workload of a second working process.

13. A method for managing data large in-memory databases the method comprising:
 storing a plurality of data sets in a plurality of data set groups such that the plurality of data sets is assigned to the plurality of data set groups, wherein every data set group comprises at least one data set and every data set is stored in one data set group only; and
 dynamically assign each execution context in a set of execution contexts to a data set group in a shared address space, wherein each data set group is a partition exclusively owned by an execution context and the partitions are re-sized in a rebalancing event and remapped to other execution contexts by;
 a) assigning an execution context to each data set group;
 b) estimating a number of data set requests for every data set;
 c) determining data sets for every data set group based on the estimated number of data set requests and reassigning the data sets to the data set groups such that the estimated number of data set requests in a data set group is less than or equal to a predetermined number of data set requests for at least one exclusive execution context which is assigned to one of the plurality of data set groups;
 d) creating a plurality of execution contexts;
 e) assigning each execution context to one data set group;
 f) determining an average load of one execution context;
 g) creating additional execution contexts when the average load exceeds a predetermined load value; and
 h) shutting down at least one of the execution contexts and reassigning the corresponding data set groups to the remaining execution contexts without moving the corresponding data set groups, when the system workload is reduced.

14. The method of claim 13 further including dynamically adapting the predetermined number of data set requests for at least one execution context which is assigned to one of the plurality of data set groups during an operation of the data management device.

15. The method of claim 13 further comprising:
 estimating a likelihood of data set requests for every data set; and
 determining the data sets for every data set group based on a cumulative likelihood function of requests and reassigning the data sets to the data set groups such that the likelihood of the number of requests in a data set group is less than or equal to a predetermined number of data set requests for at least one execution context which is assigned to one of the plurality of data set groups.

16. The method of claim 15, wherein the likelihood of the number of data set requests per data set is estimated by measuring the number of data set requests applied to each data set, scaled by individual request weight parameters and the cumulative likelihood distribution function (CDF) obtained on the likelihood of requests on datasets.

17. A non-transitory computer readable medium comprising processor-executable instructions, which when executed, causes a processor to implement the following operations:
 assigning each execution context in a set of execution contexts to a data set group in a shared address space, wherein each data set group is a partition exclusively owned by an execution context and the partitions are re-sized in a rebalancing event and remapped to other execution contexts by;
 a) storing a plurality of data sets in a plurality of data set groups such that the plurality of data sets is assigned to the plurality of data set groups, wherein every data set group comprises at least one data set and every data set is stored in one data set group only;
 b) assigning, an execution context to each data set group;
 c) estimating a number of data set requests for every data set;
 d) determining data sets for every data set group based on the estimated number of data set requests and reassigning the data sets to the data set groups such that the number of data set requests in a data set group is less than or equal to a predetermined number of data set requests for at least one execution context which is assigned to one of the plurality of data set groups;
 e) creating a plurality of execution contexts;
 f) assigning each execution context to one data set group;
 g) determining an average load of one execution context;

h) creating additional execution contexts when the average load exceeds a predetermined load value; and i) shutting down at least one of the execution contexts and reassigning the corresponding data set groups to the remaining execution contexts without moving the corresponding data set groups, when the system workload is reduced.

18. The non-transitory computer readable medium of claim 17, wherein the operations further comprise dynamically adapting the predetermined number of data set requests for at least one execution context which is assigned to one of the plurality of data set groups during an operation of the data management device.

* * * * *